(12) United States Patent
Jeon et al.

(10) Patent No.: US 8,237,898 B2
(45) Date of Patent: Aug. 7, 2012

(54) BI-AXIAL RETARDATION COMPENSATION FILM AND VERTICALLY ALIGNED LIQUID CRYSTAL DISPLAY USING THE SAME

(75) Inventors: Byoung-kun Jeon, Daejeon (KR); Sergey Belyaev, Daejeon (KR); Jeong-su Yu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 69 days.

(21) Appl. No.: 12/840,172

(22) Filed: Jul. 20, 2010

(65) Prior Publication Data

US 2011/0032463 A1 Feb. 10, 2011

Related U.S. Application Data (62) Division of application No. 10/543,689, filed as application No. PCT/KR2004/000133 on Jan. 27, 2004, now Pat. No. 7,782,428.

(30) Foreign Application Priority Data

Jan. 28, 2003 (KR) .................. 10-2003-0005468

(51) Int. Cl.
*G02F 1/1335* (2006.01)
(52) U.S. Cl. ........................ 349/117; 349/118
(58) Field of Classification Search ........... 349/117–121
See application file for complete search history.

(56) References Cited

U.S. PATENT DOCUMENTS

| | | | |
|---|---|---|---|
| 4,889,412 A | 12/1989 | Clerc et al. | |
| 6,141,075 A | 10/2000 | Ohmuro et al. | |
| 6,359,671 B1 * | 3/2002 | Abileah | 349/119 |
| 6,362,862 B1 | 3/2002 | Itoh et al. | |
| 6,373,542 B1 | 4/2002 | Yamahara et al. | |
| 6,565,974 B1 | 5/2003 | Uchiyama et al. | |
| 6,638,582 B1 | 10/2003 | Uchiyama et al. | |
| 6,642,981 B1 | 11/2003 | Ohmuro et al. | |

(Continued)

FOREIGN PATENT DOCUMENTS

EP    0 239 433 A1    2/1987

(Continued)

OTHER PUBLICATIONS

PCT International Search Report, PCT/KR2004/000133.

*Primary Examiner* — Mark Robinson
*Assistant Examiner* — Charles Chang
(74) *Attorney, Agent, or Firm* — McKenna Long & Aldridge LLP (57) ABSTRACT

The present invention relates to a vertically aligned LCD (VA-LCD) employing a bi-axial retardation compensation film, in which an in-plain refractive index ($n_x$, $n_y$) and a thickness refractive index ($n_z$) of the film is $n_x > n_y > n_z$. The film has a reversed wavelength dispersion in which retardation is increased in proportion to the increase of a wavelength in the range of visible rays and has a normal wavelength dispersion in which an absolute value of the thickness retardation is decreased in proportion to the increase of a wavelength in the range of visible rays. The VA-LCD cell having a retardation compensation characteristic is comprised by arranging a bi-axial retardation compensation film between the vertically aligned panel and a upper and lower polarizing plate. The VA-LCD of the present invention improves contrast characteristics on a front surface and at a tilt angle and minimizes coloring in a black state according to the tilt angle.

8 Claims, 7 Drawing Sheets

U.S. PATENT DOCUMENTS

| | | |
|---|---|---|
| 7,012,663 B2 | 3/2006 | Ono et al. |
| 7,176,999 B2 | 2/2007 | Miyachi |
| 2002/0041352 A1* | 4/2002 | Kuzuhara et al. ............. 349/117 |

FOREIGN PATENT DOCUMENTS

| | | |
|---|---|---|
| EP | 0 793 133 A2 | 9/1997 |
| EP | 104526 A1 | 10/2000 |
| EP | 1 118 885 A1 | 7/2001 |
| JP | 2000-131693 | 5/2000 |
| JP | 2001-042127 A | 2/2001 |
| KR | 1998-025147 | 7/1998 |
| KR | 259111 | 6/2000 |
| WO | WO 95/00879 | 1/1995 |
| WO | WO 01/09649 A1 | 8/2001 |

* cited by examiner

BI-AXIAL RETARDATION COMPENSATION FILM AND VERTICALLY ALIGNED LIQUID CRYSTAL DISPLAY USING THE SAME

This application is a Divisional Application of U.S. application Ser. No. 10/543,689, filed Jan. 25, 2006 now U.S. Pat. No. 7,782,428, which is a National Phase Application of International Application No. PCT/KR2004/000133, filed Jan. 27, 2004, which claims priority to Korean Patent Application No. 10-2003-0005468, filed Jan. 28, 2003, all of which are hereby incorporated by reference for all purposes in its entirety.

TECHNICAL FIELD

The present invention relates to a bi-axial retardation compensation film and vertically aligned liquid crystal display (hereinafter, referred to as a "VA-LCD") using the same, capable of improving viewing angle characteristics.

BACKGROUND ART

As well known to those skilled in the art, a -C-plate compensation film and an A-plate compensation film have been used to compensate for a black state of a VA-LCD under the condition that small drive voltage is applied. U.S. Pat. No. 4,889,412 discloses a conventional VA-LCD using the -C-plate compensation film.

However, the conventional VA-LCD using the -C-plate compensation film does not completely compensate for a black state, thus having a disadvantage such as a leakage of light at a viewing angle.

Further, U.S. Pat. No. 6,141,075 discloses a conventional VA-LCD comprising both the -C-plate compensation film and the A-plate compensation film.

The above VA-LCD comprising both the -C-plate compensation film and the A-plate compensation film more completely achieves compensation of a black state under the condition that small drive voltage is applied.

However, the above-described conventional VA-LCDs require improvements of contrast and coloring at a front surface and a tilt angle in order to completely compensate for the black state.

DISCLOSURE OF THE INVENTION

Therefore, the present invention has been made in view of the above problems, and it is an object of the present invention to provide a bi-axial retardation compensation film and an achromatic VA-LCD using the same, in which contrast at a front surface and a tilt angle of the VA-LCD filled with liquid crystal having a positive or negative dielectric anisotropy is improved, and coloring at the tilt angle in a black state is minimized, thus improving of viewing angle characteristics.

In order to accomplish the above object, the present invention provides a bi-axial retardation compensation film satisfying $n_x > n_y > n_z$, $R_{in} = (n_x - n_y) \times d > 0$ and $R_{th} = (n_z - n_y) \times d < 0$, wherein $n_x$ and $n_y$ are in-plain refractive indexes, $n_z$ is a thickness refractive index, $R_{in}$ is a in-plain retardation, $R_{th}$ is a thickness retardation and d is a thickness.

The bi-axial retardation compensation film has a wavelength dispersion ($R_{in,400}/R_{in,550}$) in the range of 0.4~0.9 at wavelengths of 400 nm and 550 nm, and a wavelength dispersion ($R_{in,700}/R_{in,550}$) in the range of 1.1~1.8 at wavelengths of 700 nm and 550 nm.

An in-plain retardation ($R_{in}$) of the bi-axial retardation compensation film is in the range of 30~150 nm at a wavelength of 550 nm.

The bi-axial retardation compensation film has a wavelength dispersion ($R_{th,400}/R_{th,550}$) in the range of 1.05~1.4 at wavelengths of 400 nm and 550 nm, and a wavelength dispersion ($R_{th,700}/R_{th,550}$) in the range of 0.5~0.95 at wavelengths of 700 nm and 550 nm.

A thickness retardation ($R_{th}$) of the bi-axial retardation compensation film is in the range of -50~-500 nm at 550 nm.

The bi-axial retardation compensation film can be manufactured by elongating a polymer prepared with co-polymerization of a first monomer and a second monomer, wherein the first monomer has a characteristic positive of a double refraction and the second monomer has a characteristic negative of a double refraction.

The bi-axial retardation compensation film can be manufactured by elongating a polymer prepared by mixing a first monomer and a second monomer, wherein the first monomer has a characteristic positive of a double refraction and the second monomer has a characteristic negative of a double refraction.

The bi-axial retardation compensation film can be prepared by laminating more than two sheets having different dependability of a in-plane retardation ($R_{in}$) and a thickness retardation ($R_{th}$).

Also, in a vertically aligned LCD (VA-LCD) using a multi-domain mode or a chiral additive, provided with a bi-axial retardation compensation film, in which a vertically aligned panel is formed by injecting liquid crystal having a negative dielectric anisotropy ($\Delta \in < 0$) or a positive dielectric anisotropy ($\Delta \in > 0$) into a gap between upper and lower glass-substrates, and upper and lower polarizing plates are arranged above the upper and lower surfaces of the VA-panel so that optical absorption axes of the polarizing plates are perpendicular to each other with the VA-panel as the central figure, and a cell gap in the range of 3 μm to 8 μm is maintained, a liquid crystal cell is prepared by arranging a bi-axial retardation compensation film between the vertically aligned panel and a upper and lower polarizing plate in which a in-plain refraction index ($n_x$, $n_y$) and a thickness refraction index ($n_z$) of the bi-axial retardation compensation film is $n_x > n_y > n_z$.

And an optical axis of the bi-axial retardation compensation film is arranged to be perpendicular to an absorption axis of an adjacent polarizing plate, and the bi-axial retardation compensation film has a reversed wavelength dispersion in which a in-plain retardation is increased in proportion to the increase of a wavelength in the range of visible rays, and has a normal wavelength dispersion in which an absolute value of the thickness retardation is decreased in proportion to the increase of a wavelength in the range of visible rays.

In Example 1 of a vertically aligned LCD in accordance with the present invention, a liquid crystal cell is prepared by arranging the bi-axial retardation compensation film at one place of between the vertically aligned panel and upper polarizing plate, or between the vertically aligned panel and lower polarizing plate.

In Example 2 of a vertically aligned LCD in accordance with the present invention, a liquid crystal cell is prepared by arranging one of the individual bi-axial retardation compensation films between the vertically aligned panel and upper polarizing plate, or between the vertically aligned panel and lower polarizing plate.

In particular, the total of a thickness retardation including the vertically aligned panel and the bi-axial retardation compensation film being applied in the vertically aligned LCD is in the range of 30~150 nm in proportion of a wavelength in the range of visible rays.

Also, in each of the above examples according to the present invention, directors of liquid crystalline polymers of the VA-panel, under the condition that no voltage is applied to the VA-panel, may have a pretilt angle in the range of 75° to 90° between the upper and lower glass substrates. The pretilt angle is preferably in the range of 87° to 90°, more preferably in the range of 89° to 90°.

Also, in each of the above examples according to the present invention, a liquid crystalline layer formed on the VA-panel may have a retardation in the range of 80 nm to 400 nm, preferably 80 nm to 300 nm, at a wavelength of 550 nm.

A rubbed director of the liquid crystals of the VA-panel, under the condition that voltage is applied to the VA-panel, has an angle of 45° with the optical absorption axes of the polarizing plates.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be described in detail with reference to the annexed drawings.

Figure 1:
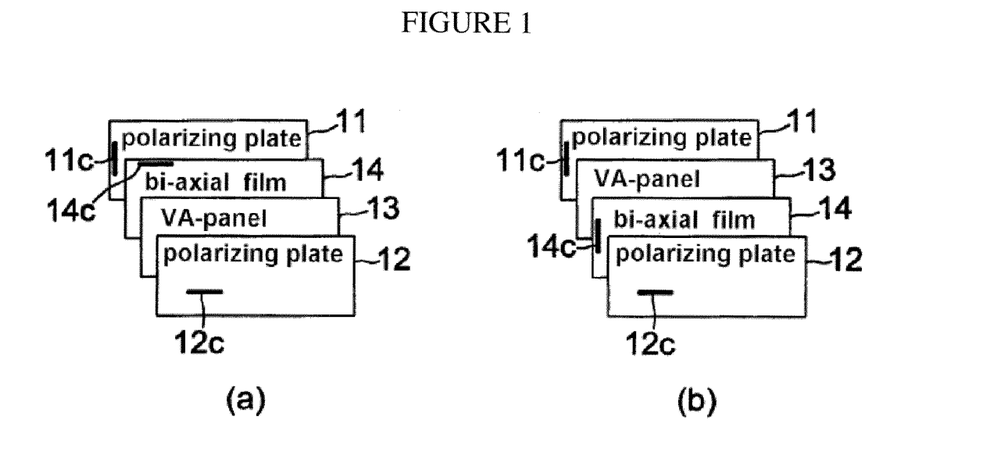
FIG. 1 is a perspective view of a VA-LCD cell comprising a bi-axial retardation compensation film in accordance with Example 1 according to the present invention.
Figure 2:
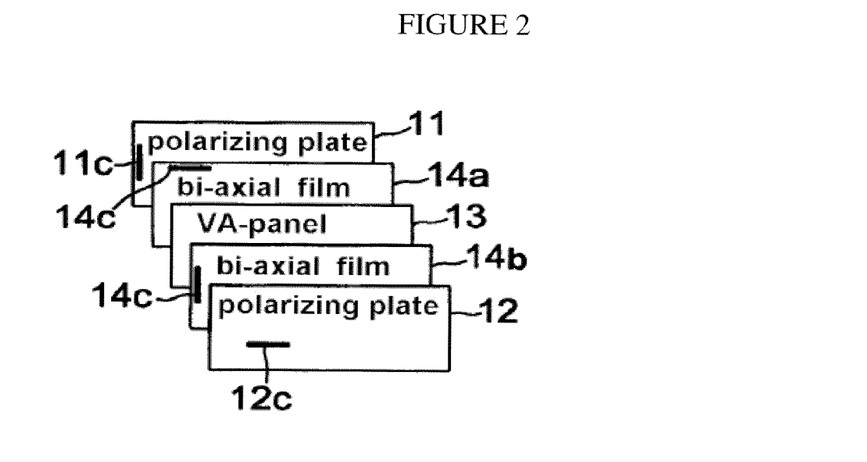
FIG. 2 is a perspective view of a VA-LCD cell comprising a bi-axial retardation compensation film in accordance with Example 2 according to the present invention.

FIGS. 1a, 1b and 2 illustrate respective examples of the VA-LCD in accordance with the present invention, wherein a VA-LCD cell is prepared by arranging bi-axial retardation compensation films 14, 14a, 14b between two polarizing plates 11, 12 so that absorption axes are perpendicular to each other with the VA-panel 13 as the central figure. Here, the polarizing plates 11, 12 can be comprised of a TAC (triacetate cellulose) protection film having a characteristic thickness retardation or other protection film not having a thickness retardation.

FIGS. 1a and 1b are a structure of a VA-LCD cell according to Example 1 which is prepared by arranging one of a bi-axial retardation compensation film 14 between two of upper and lower polarizing plates 11, 12 which are perpendicular to a vertically aligned panel 13 so that a cell gap of 3~8 μm is maintained.

FIG. 1a illustrates an essential form of Example 1, in which a bi-axial retardation compensation film 14 is arranged between a vertically aligned panel 13 and a lower polarizing plate 11, wherein an optical axis 14c of the bi-axial retardation compensation film 14 is placed to be perpendicular to the an absorption axis 11c of the lower polarizing plate 11.

FIG. 1b illustrates other modified example of Example 1, in which a bi-axial retardation compensation film 14 is arranged between a vertically aligned panel 13 and a upper polarizing plate 12, wherein an optical axis 14c of the bi-axial retardation compensation film 14 is placed to be perpendicular to the an absorption axis 12c of the upper polarizing plate 12.

FIG. 2 is a structure of a VA-LCD cell according to Example 2 which is prepared by arranging two of bi-axial retardation compensation films 14a, 14b between two of upper and lower polarizing plates 11, 12 which are perpendicular to a vertically aligned panel 13 so that a cell gap of 3~8 μm is maintained.

FIG. 2 illustrates a VA-LCD cell of Example 2 in which one of the bi-axial retardation compensation film 14a is placed between a vertically aligned panel 13 and a lower polarizing plate 11, and another bi-axial retardation compensation film 14b is placed between a vertically aligned panel 13 and a upper polarizing plate 12, wherein an optical axis 14c of the bi-axial retardation compensation film 14a, placed between the vertically aligned panel 13 and the lower polarizing plate 11, is arranged to be perpendicular to an absorption axis 11c of the lower polarizing plate 11, and an optical axis 14c of the bi-axial retardation compensation film 14b, placed between the vertically aligned panel 13 and the upper polarizing plate 12, is arranged to be perpendicular to an absorption axis 12c of the upper polarizing plate 12.

Figure 3:
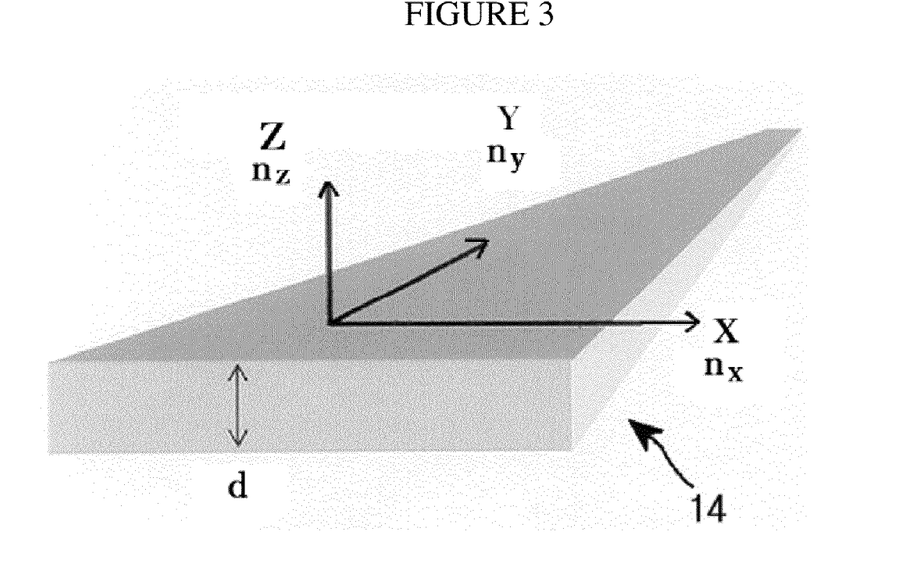
FIG. 3 is a reference view of a refraction index of a bi-axial retardation compensation film according to the present invention.

FIG. 3 shows a refraction index of a bi-axial retardation compensation film in accordance with the present invention.

As shown in FIG. 3, a bi-axial retardation compensation film 14 according to the present invention has a refraction index of $n_x > n_y > n_z$, wherein $n_x$ and $n_y$ are in-plain refractive indexes, $n_z$ is a thickness refractive index.

The bi-axial retardation compensation film has the following important characteristics.

A in-plane retardation value ($R_{in} = d \times n_x - n_y$, wherein d is a thickness of film) of the bi-axial retardation compensation film has a reversed wavelength dispersion in which retardation is increased in proportion to the increase of a wavelength in the range of visible rays.

A thickness retardation value ($R_{th} = d \times (n_z - n_y)$, wherein d is a thickness of film) of the bi-axial retardation compensation film is negative value, and has a reversed wavelength dispersion in which retardation is increased in proportion to the increase of a wavelength in the range of visible rays.

Figure 4:
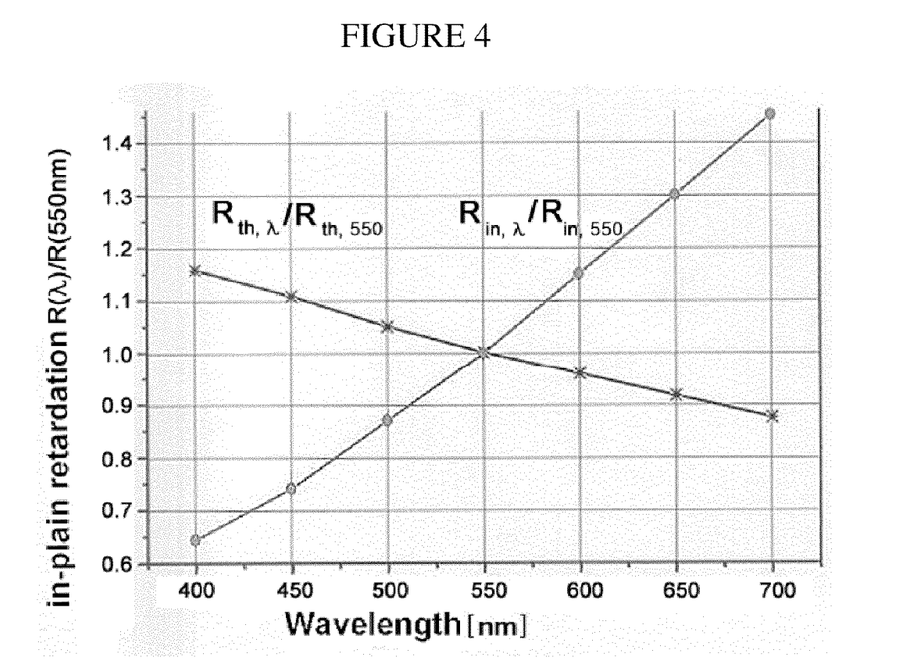
FIG. 4 is a graph showing a dependability of a wavelength dispersion of thickness retardation and a wavelength dispersion of a in-plain retardation of a bi-axial retardation compensation film applied in the present invention.

FIG. 4 is a reference view showing a dependability of a retardation value according to a wavelength of a bi-axial retardation compensation film in accordance with the present invention, which shows a wavelength dispersion ($R_{th,\lambda}/R_{th,550}$) of a thickness retardation of the bi-axial retardation compensation film, and a wavelength dispersion ($R_{in,\lambda}/R_{in,550}$) of a in-plain retardation.

As shown in FIG. 4, in a bi-axial retardation compensation film according the present invention, an appropriate wavelength dispersion of a in-plain retardation value should have a relative retardation ratio ($R_{in,400}/R_{in,550}$) in the range of 0.4~0.9 at wavelengths of 400 nm and 550 nm, and a relative retardation ratio ($R_{in,700}/R_{in,550}$) in the range of 1.1~1.8 at wavelengths of 700 nm and 550 nm, wherein $R_{in,400}$ is a in-plain retardation at a wavelength of 400 nm, and $R_{in,550}$ is a in-plain retardation at a wavelength of 550 nm, and $R_{in,700}$ is a in-plain retardation at a wavelength of 700 nm.

An appropriate range of in-plain retardation of the bi-axial retardation compensation film according to the present invention is in the range of 30~150 nm at a wavelength of 550 nm.

Also, an appropriate wavelength dispersion of a thickness retardation of a biaxial retardation compensation film according to the present invention should have a relative retardation ratio ($R_{th,400}/R_{th,550}$) in the range of 1.05~1.4 at wavelengths of 400 nm and 550 nm, and a relative retardation ratio ($R_{th,700}/R_{th,550}$) in the range of 0.5~0.95 at wavelengths of 700 nm and 550 nm.

An appropriate range of the thickness retardation value ($R_{th} = d \times (n_z - n_y)$) is in the range of −50~−550 nm at a wavelength of 550 nm.

Accordingly, in case of preparing a vertically aligned LCD shown in FIGS. 1a, 1b and 2, by using a bi-axial retardation compensation film according to the present invention, a complete compensation in a dark state of the VA-LCD at a tilt angle is possible, and a color variation of a dark state, a bright state and a RGB color can be minimized.

Figure 5:
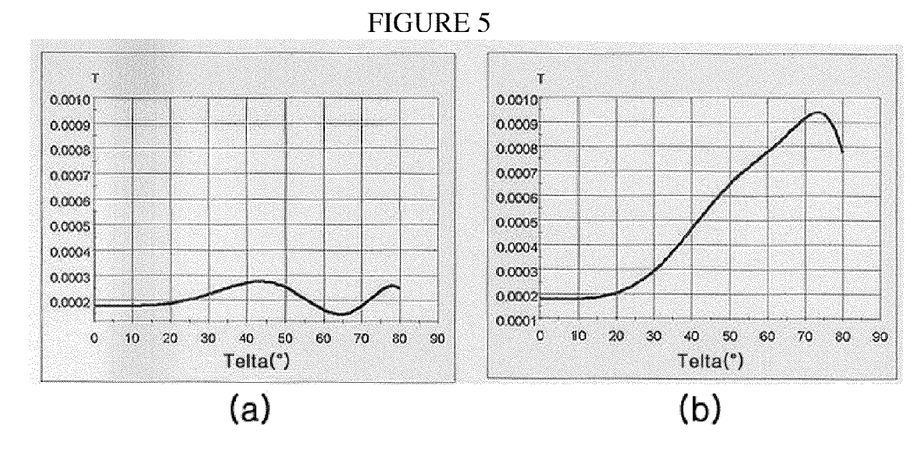
FIG. 5 is graphs showing the results of simulation for (a) a transmittance according to a visual angle in a black state of the VA-LCD applying a bi-axial retardation compensation film according to the present invention, and (b) a transmittance according to a visual angle in a black state of the VA-LCD applying a conventional bi-axial retardation compensation film.

FIG. 5 is the results of comparing (a) a transmittance according to a visual angle in a black state of the VA-LCD applying a bi-axial retardation compensation film according to the present invention with (b) a transmittance according to a visual angle in a black state of the VA-LCD applying a conventional bi-axial retardation compensation film. It can be known that the bi-axial retardation compensation film according to the present invention has an excellent compensation in a black state more than a conventional bi-axial retardation compensation film.

For reference, the conventional bi-axial retardation compensation film is a polycarbonate retardation film, and a wavelength dispersion ($R_{th,400}/R_{th,550}$)=($R_{in,400}/R_{in,550}$) thereof is 1.15.

Figure 6:
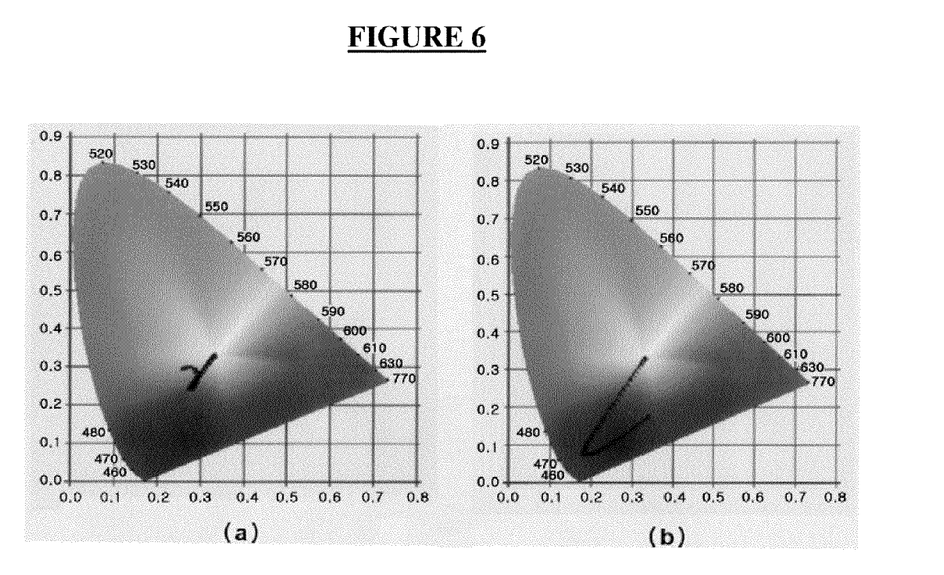
FIG. 6 is diagrams showing the results of simulation for (a) a color variation in a black state of the VA-LCD applying a bi-axial retardation compensation film according to the present invention, and (b) a color variation in a black state of the VA-LCD applying a conventional retardation compensation film.
Figure 7:
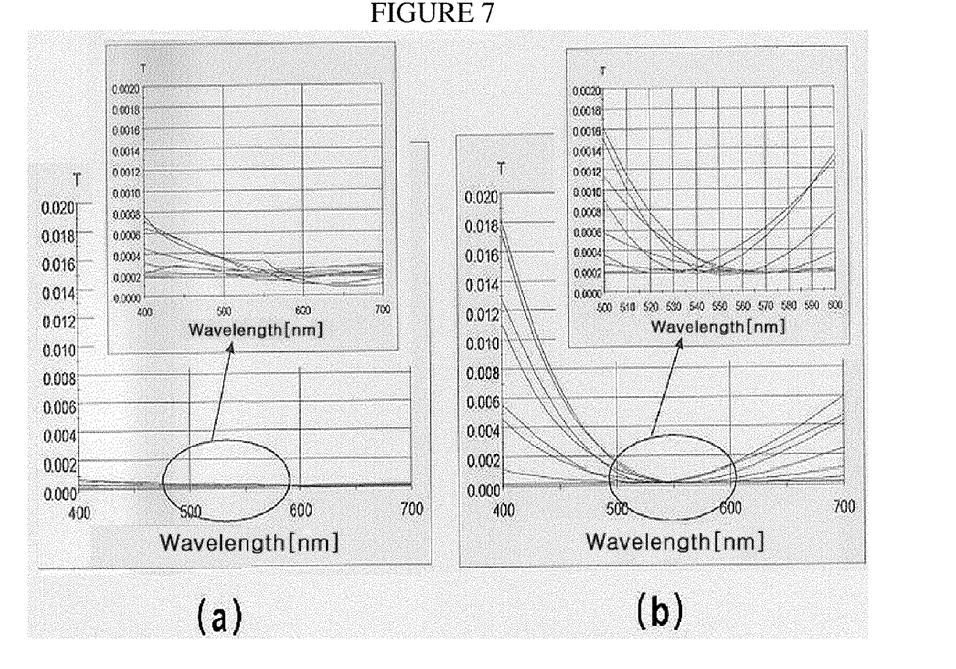
FIG. 7 is graphs showing the results of simulation for (a) a transmittance in a black state according to a wavelength of the VA-LCD applying a bi-axial retardation compensation film according to the present invention, and (b) a transmittance in a black state according to a wavelength of the VA-LCD applying a conventional bi-axial retardation compensation film.

FIG. 6 is the results of comparing (a) a color variation in a black state of the VA-LCD applying a bi-axial retardation compensation film according to the present invention with (b) a color variation in a black state of the VA-LCD applying a conventional retardation compensation film. It can be known that a color variation in a black state of a bi-axial retardation compensation film of the present invention is much smaller than that of a conventional bi-axial retardation compensation film.

The reason for showing a low transmittance in a black state and a small color variation in a black state when employing a bi-axial retardation compensation film of the present invention is that a transmittance variation in accordance with a wavelength is flat.

A bi-axial retardation compensation film in accordance with the present invention can be prepared by laminating 2~3 of a conventional film having a different dependability of retardation to a wavelength.

Also, the bi-axial retardation compensation film can be manufactured by elongating a polymer prepared with co-polymerization of a first monomer and a second monomer, or by elongating a polymer prepared by mixing a first monomer and a second monomer, wherein the first monomer has a characteristic positive of a double refraction and the second monomer has a characteristic negative of a double refraction.

Example 1

A VA-LCD was prepared by arranging one of a bi-axial retardation compensation film 14 between a vertically aligned panel 13 and upper and lower polarizing plates 11, 12 which are perpendicular to each other so that a cell gap of 3~8 µm is maintained.

FIG. 1a illustrates an essential form of Example 1, in which a bi-axial retardation compensation film 14 is arranged between a vertically aligned panel 13 and a lower polarizing plate 11, wherein an optical axis 14c of the bi-axial retardation compensation film 14 is placed to be perpendicular to the an absorption axis 11c of the lower polarizing plate 11.

FIG. 1b illustrates other modified example of Example 1, in which a bi-axial retardation compensation film 14 is arranged between a vertically aligned panel 13 and a upper polarizing plate 12, wherein an optical axis 14c of the bi-axial retardation compensation film 14 is placed to be perpendicular to the an absorption axis 12c of the upper polarizing plate 12.

Example 2

A VA-LCD as shown in FIG. 2 was prepared by arranging two of bi-axial retardation compensation films 14a, 14b between two of upper and lower polarizing plates 11, 12 which are perpendicular to a vertically aligned panel 13 so that a cell gap of 3~8 µm is maintained.

Namely, two of bi-axial retardation compensation film was employed in this Example 2, in which one of the bi-axial retardation compensation film 14a is placed between a vertically aligned panel 13 and a lower polarizing plate 11, and another bi-axial retardation compensation film 14b is placed between a vertically aligned panel 13 and a upper polarizing plate 12, wherein an optical axis 14c of the bi-axial retardation compensation film 14a, placed between the vertically aligned panel 13 and the lower polarizing plate 11, is arranged to be perpendicular to an absorption axis 11c of the lower polarizing plate 11, and an optical axis 14c of the bi-axial retardation compensation film 14b, placed between the vertically aligned panel 13 and the upper polarizing plate 12, is arranged to be perpendicular to an absorption axis 12c of the upper polarizing plate 12.

Hereinafter, experimental examples for testing contrast characteristics of samples selected from the above examples of a VA-LCD employing a bi-axial retardation compensation film of the present invention will be described. Improvements of the contrast characteristics in the respective examples will be more easily understood by the below experimental examples. The below experimental examples will be disclosed for illustrative purposes, but do not limit the subject matter of the present invention.

Experimental Example 1

A VA-LCD of FIG. 1(a) applying one of a bi-axial retardation compensation film prepared by Example 1 was used as a sample in this Experimental Example.

The VA-LCD included a VA-panel having a cell gap of 3 μm, wherein a pretilt angle was 89°, a dielectric anisotropy (Δ∈) was −4.9, a refractive anisotropy (Δn) was 0.0979, and a wavelength dispersion ($\Delta n_{400}/\Delta n_{550}$) was 1.096. Accordingly, a thickness retardation ($R_{VA,550}$) of the VA-panel at a wavelength of 550 nm was 297 nm.

The bi-axial retardation compensation film was prepared with polycarbonate series, wherein a thickness retardation value ($R_{th}$(550 nm)) was −270 nm, a in-plain retardation value ($R_{in}$(550 nm)) was 67 nm, a wavelength dispersion of a thickness retardation ($R_{th}$(450 nm)/$R_{th}$(550 nm)) was 1.15, and a wavelength dispersion of a in-plain retardation ($R_{in}$(450 nm)/$R_{in}$(550 nm)) was 0.652.

Figure 8:
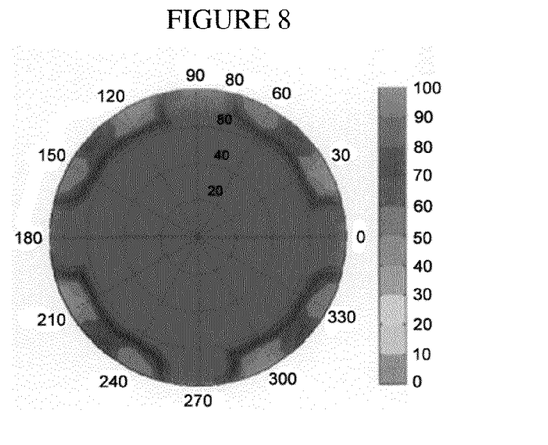
FIG. 8 is a diagram showing the result of simulation of a contrast ratio for a structure of the VA-LCD of Example 1 at a tilt angle in the range of all azimuth angles, when applying a white ray.

FIG. 8 shows the result of simulation of a contrast ratio of the VA-LCD compensated by employing the above bi-axial retardation compensation film, and FIG. 6 shows a color variation in a black state of the VA-LCD compensated by employing the above bi-axial retardation compensation film.

Modified Example of Experimental Example 1

A VA-LCD of FIG. 1(b) applying one of a bi-axial retardation compensation film prepared by Example 1 was used as a sample in this Experimental Example.

The VA-LCD included a VA-panel having a cell gap of 3 μm, wherein a pretilt angle was 89°, a dielectric anisotropy (Δ∈) was −4.9, a refractive anisotropy (Δn) was 0.0979, and a wavelength dispersion ($\Delta n_{400}/\Delta n_{550}$) was 1.096. Accordingly, a thickness retardation ($R_{VA,550}$) of the VA-panel at a wavelength of 550 nm was 297 nm.

The bi-axial retardation compensation film was prepared with triacetate cellulose (TAC) series, wherein a thickness retardation value ($R_{th}$(550 nm)) was −241 nm, a in-plain retardation value ($R_{in}$(550 nm)) was 44 nm, a wavelength dispersion of a thickness retardation ($R_{th}$(450 nm)/$R_{th}$(550 nm)) was 1.12, and a wavelength dispersion of a in-plain retardation ($R_{in}$(450 nm)/$R_{in}$(550 nm)) was 0.61.

Figure 9:
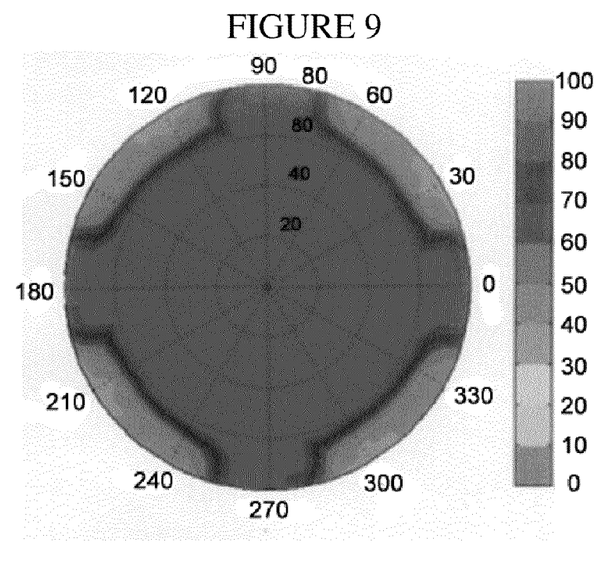
FIG. 9 is a diagram showing the result of simulation of a contrast ratio for a structure of the VA-LCD, which is a modified example of Example 1, at a tilt angle in the range of 0°~80° at all azimuth angles, when applying a white ray.
Figure 10:
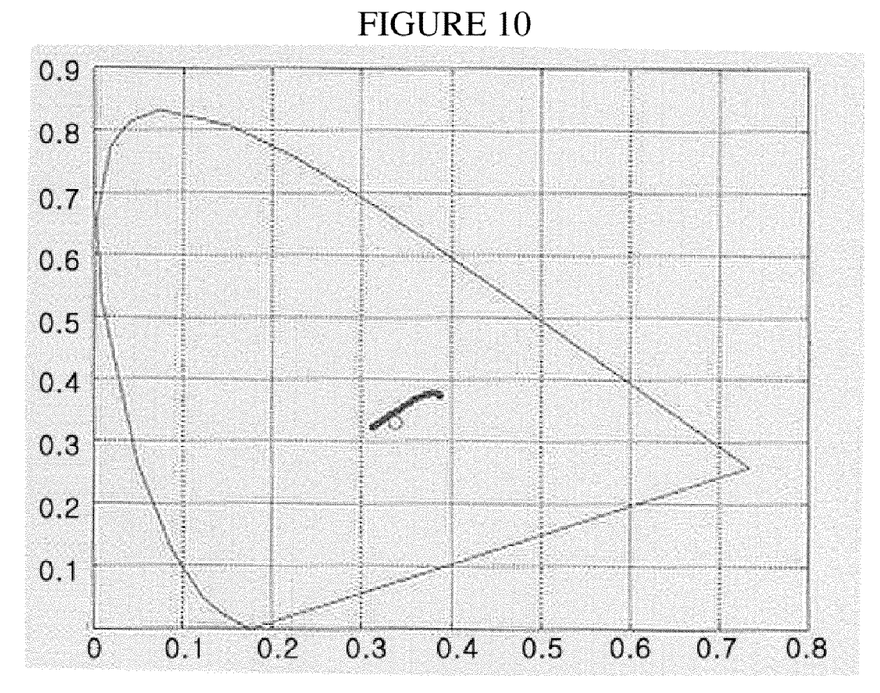
FIG. 10 is a graph showing the result of simulation for a color variation in a black state of a structure of the VA-LCD, which is modified example of Example 1, at a tilt angle in the range of 0°~80°, which is varied by an interval of 2°, at azimuth angle of 45°, when applying a white ray.

FIG. 9 shows the result of simulation of a contrast ratio for a structure of the VA-LCD, and also FIG. 10 shows the result of simulation for a color variation in a black state of a structure of the VA-LCD.

Table 1 comparatively shows contrasts of the sample (hereinafter, referred to as a 'first sample') employed by the Modified Example of Experimental Example 1 and a sample (hereinafter, referred to as a 'second sample') serving as a comparative example. Here, in the first sample, the retardation ($R_{VA}$) of the VA-panel at 550 nm, the thickness retardation ($R_{th}$) of the bi-axial retardation film, the total retardation ($R_{TOTAL}$) of the two retardation ($R_{VA}$, $R_{th}$), and the in-plain retardation ($R_{in}$) of the bi-axial retardation film were 297, −240, +46 and 90, respectively. On the other hand, in the second sample, the retardation ($R_{VA}$) of the VA-panel at 550 nm, the thickness retardation ($R_{th}$) of the bi-axial retardation film, the total retardation ($R_{TOTAL}$) of the two retardation ($R_{VA}$, $R_{th}$), and the in-plain retardation ($R_{in}$) of the bi-axial retardation film were 297, −100, +197 and 0, respectively. And the minimum contrasts of the first and second samples at a tilt angle of 70° were 160 and 5, respectively.

TABLE 1

| | $R_{VA}$ | $R_{th}$ | $R_{TOTAL}$ | $R_{in}$ | Minimum contrast (at a tilt angle of 70°) |
|---|---|---|---|---|---|
| First sample (Experimental Example) | 297 | −240 | +46 | 395 | 160 |
| Second sample (Comparative Example) | 297 | −100 | +197 | 460 | 5 |

In Table 1, the minimum contrasts of the first and second samples at a tilt angle of 70° were 160 and 5. Since the tilt angle of 70° has the minimum contrast, other tilt angles rather than the tilt angle of 70° have contrasts higher than the minimum contrast. Accordingly, the contrasts at other tilt angles rather than the tilt angle of 70° are higher than the minimum contrast.

Experimental Example 2

A VA-LCD of FIG. 2 applying two of a bi-axial retardation compensation film prepared by Example 2 was used as a sample in this Experimental Example.

The VA-LCD included a VA-panel having a cell gap of 3 μm, wherein a pretilt angle was 89°, a dielectric anisotropy (Δ∈) was −4.9, a refractive anisotropy (an) was 0.0979, and a wavelength dispersion ($\Delta n_{400}/\Delta n_{550}$) was 1.096. Accordingly, a thickness retardation ($R_{VA,550}$) of the VA-panel at a wavelength of 550 nm was 297 nm.

The two of bi-axial retardation compensation films were prepared with polycarbonate series, wherein a thickness retardation value ($R_{th}$(550 nm)) was −119 nm, a in-plain retardation value ($R_{in}$(550 nm)) was 44 nm, a wavelength dispersion of a thickness retardation ($R_{th}$(450 nm)/$R_{th}$(550 nm)) was 1.24, and a wavelength dispersion of a in-plain retardation ($R_{in}$(450 nm)/$R_{in}$(550 nm)) was 0.585.

Figure 11:
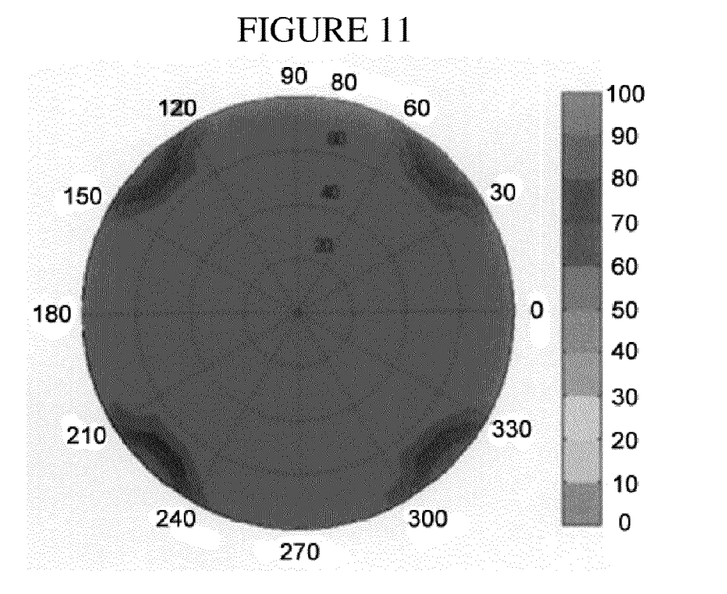
FIG. 11 is a diagram showing the result of simulation for a contrast ratio of a structure of the VA-LCD of Example 2 at a tilt angle in the range of 0°~80° at all azimuth angles, when applying a white ray.
Figure 12:
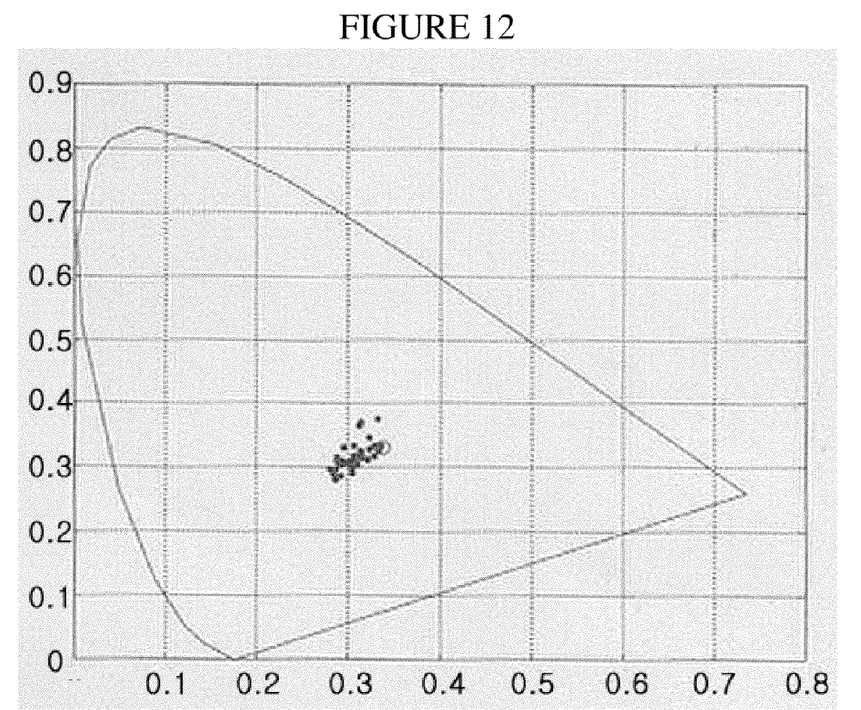
FIG. 12 is a graph showing the result of simulation for a color variation in a black state of a structure of the VA-LCD of Example 2, at a tilt angle in the range of 0°~80°, which is varied by an interval of 2°, at azimuth angle of 45°, when applying a white ray.

FIG. 11 shows the result of simulation of a contrast ratio for a structure of the VA-LCD, and also FIG. 12 shows the result of simulation for a color variation in a black state of a structure of the VA-LCD.

INDUSTRIAL APPLICABILITY

As apparent from the above description, the present invention provides a VA-LCD comprising a bi-axial retardation compensation film, which compensates for a dark state at a tilt angle of the VA-LCD and minimizes coloring in dark, white and RGB states, thus improving viewing angle characteristics.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A bi-axial retardation compensation film having $n_x > n_y > n_z$, $R_{in} = (n_x - n_y) \times d > 0$ and $R_{th} = (n_z - n_y) \times d < 0$, wherein $n_x$ and $n_y$ are in-plane refractive indexes, $n_z$ is a thickness refractive index, $R_{in}$ is a in-plane retardation, $R_{th}$ is a thickness retardation and d is a thickness, wherein a wavelength dispersion ($R_{in,400}/R_{in,550}$) is in the range of 0.4~0.9 at wavelengths of 400 nm and 550 nm, and a wavelength dispersion ($R_{in,700}/R_{in,550}$) is in the range of 1.1~1.8 at wavelengths of 700 nm and 550 nm, wherein $R_{in,400}$, $R_{in,550}$ and $R_{in,700}$ are in-plane retardations at wavelengths of 400 nm, 550 nm and 700 nm.

2. The bi-axial retardation compensation film according to claim 1, wherein a in-plane retardation ($R_{in}$) is in the range of 30~150 nm at a wavelength of 550 nm.

3. The bi-axial retardation compensation film according to claim 1, wherein a wavelength dispersion ($R_{th,400}/R_{th,550}$) is in the range of 1.05~1.4 at wavelengths of 400 nm and 550 nm, and a wavelength dispersion ($R_{th,700}/R_{th,550}$) is in the range of 0.5~0.95 at wavelengths of 700 nm and 550 nm, wherein $R_{th,400}$, $R_{th,550}$ and $R_{th,700}$ are thickness retardations at wavelengths of 400 nm, 550 nm and 700 nm.

4. The bi-axial retardation compensation film according to claim 1, wherein a thickness retardation ($R_{th}$) is in the range of −50~−500 nm at 550 nm.

5. The bi-axial retardation compensation film according to claim 1, wherein said bi-axial retardation compensation film is manufactured by elongating a polymer prepared with co-polymerization of a first monomer and a second monomer, wherein the first monomer has a characteristic positive of a double refraction and the second monomer has a characteristic negative of a double refraction.

6. The bi-axial retardation compensation film according to claim 1, wherein said bi-axial retardation compensation film is manufactured by elongating a polymer prepared by mixing a first monomer and a second monomer, wherein the first monomer has a characteristic positive of a double refraction and the second monomer has a characteristic negative of a double refraction.

7. The bi-axial retardation compensation film according to claim 1, wherein said bi-axial retardation compensation film is prepared by laminating more than two sheets having different dependability of a in-plane retardation ($R_{in}$) and a thickness retardation ($R_{th}$).

8. The vertically aligned LCD according to claim 1, wherein a liquid crystal cell is prepared by arranging the bi-axial retardation compensation film at one place of between the vertically aligned panel and upper polarizing plate, or between the vertically aligned panel and lower polarizing plate.

* * * * *